US012674412B2

(12) United States Patent
Urban

(10) Patent No.: US 12,674,412 B2
(45) Date of Patent: Jul. 7, 2026

(54) METAL-BASED FUEL AND FUEL DELIVERY SYSTEMS

(71) Applicant: RAYTHEON TECHNOLOGIES CORPORATION, Farmington, CT (US)

(72) Inventor: Justin R. Urban, Tolland, CT (US)

(73) Assignee: RTX CORPORATION, Farmington, CT (US)

( * ) Notice: Subject to any disclaimer, the term of this patent is extended or adjusted under 35 U.S.C. 154(b) by 110 days.

(21) Appl. No.: 17/728,510

(22) Filed: Apr. 25, 2022

(65) Prior Publication Data

US 2023/0008152 A1 Jan. 12, 2023

Related U.S. Application Data

(60) Provisional application No. 63/209,710, filed on Jun. 11, 2021.

(51) Int. Cl.
| | |
|---|---|
| *F02C 3/26* | (2006.01) |
| *F02C 7/22* | (2006.01) |
| *F23D 17/00* | (2006.01) |
| *F23R 3/36* | (2006.01) |
| *F23R 3/50* | (2006.01) |

(52) U.S. Cl.
CPC ................ *F02C 3/26* (2013.01); *F02C 7/222* (2013.01); *F23D 17/005* (2013.01); *F23R 3/36* (2013.01); *F23R 3/50* (2013.01)

(58) Field of Classification Search
CPC .................................. F02C 3/26; F23D 17/005
See application file for complete search history.

(56) References Cited

U.S. PATENT DOCUMENTS

| | | | | |
|---|---|---|---|---|
| 2,938,782 | A * | 5/1960 | Toulmin, Jr. | C21B 5/004 75/460 |
| 2,989,388 | A * | 6/1961 | Toulmin, Jr. | C06B 47/00 149/43 |
| 3,004,841 | A * | 10/1961 | Toulmin, Jr. | C06B 27/00 149/6 |
| 3,285,007 | A * | 11/1966 | Carlisle | F23R 3/36 60/749 |
| 4,080,177 | A | 3/1978 | Boyer | |
| 4,194,358 | A * | 3/1980 | Stenger | F23R 3/42 60/776 |
| 8,656,724 | B2 | 2/2014 | Cawley et al. | |
| 9,249,757 | B2 * | 2/2016 | Zauderer | G21C 1/07 |
| 10,538,713 | B1 | 1/2020 | Willigan | |
| 11,585,291 | B2 | 2/2023 | Muldoon et al. | |
| 11,772,965 | B2 * | 10/2023 | Fischman | B01J 19/2475 423/657 |
| 2001/0049932 | A1 * | 12/2001 | Beebe | F23R 3/346 60/737 |

(Continued)

*Primary Examiner* — Devon C Kramer
*Assistant Examiner* — Marc Amar
(74) *Attorney, Agent, or Firm* — SNELL & WILMER L.L.P.

(57) ABSTRACT

A system for generating combustion gases in a turbine engine may comprise a combustion chamber and a fuel injection system configured to inject a metal-based fuel into the combustion chamber. A metal-based fuel source may be configured to deliver the metal-based fuel to the fuel injection system. The metal-based fuel may comprise a metal powder.

7 Claims, 5 Drawing Sheets

(56)         References Cited

U.S. PATENT DOCUMENTS

| 2004/0237384 A1* | 12/2004 | Orr | C10L 10/00 |
| | | | 44/314 |
| 2005/0044778 A1* | 3/2005 | Orr | C10L 1/19 |
| | | | 44/388 |
| 2009/0000186 A1 | 1/2009 | Sanders et al. | |
| 2012/0192542 A1* | 8/2012 | Chillar | F02C 9/40 |
| | | | 60/39.463 |
| 2013/0065187 A1* | 3/2013 | Yoon | C06B 43/00 |
| | | | 431/89 |
| 2013/0192232 A1* | 8/2013 | Clemen | F23R 3/50 |
| | | | 60/734 |
| 2016/0123596 A1* | 5/2016 | Hoke | F23R 3/06 |
| | | | 60/746 |
| 2018/0094590 A1* | 4/2018 | Proscia | F23R 3/12 |
| 2021/0207808 A1* | 7/2021 | Mishra | F23R 3/14 |

* cited by examiner

METAL-BASED FUEL AND FUEL DELIVERY SYSTEMS

CROSS-REFERENCE TO RELATED APPLICATIONS

This application claims priority to, and the benefit of, U.S. Provisional Application Ser. No. 63/209,710, filed Jun. 11, 2021 and titled "METAL-BASED FUEL AND FUEL DELIVERY SYSTEMS," which is incorporated by reference herein in its entirety for all purposes.

FIELD

The present disclosure relates to gas turbine engines, and, more specifically, to metal-based fuel and fuel delivery systems for gas turbine engines.

BACKGROUND

A gas turbine engine typically includes a fan section, a compressor section, a combustor section, and a turbine section. In general, during operation, air is pressurized in the fan and compressor sections and is mixed with fuel and burned in the combustor section to generate hot combustion gases. The hot combustion gases flow through the turbine section, which extracts energy from the hot combustion gases to 2021—power the compressor section and other gas turbine engine loads.

Environmental regulations, along with the desire to reduce carbon emissions and other pollutants, have created a need to find alternative, non-carbon based fuels, such as hydrogen and ammonia. However, these alternative fuels present their own challenges. For example, transportation, containment, and safety are concerns for using hydrogen as fuel, and the generation of nitrogen oxides (NOx) is a drawback to using ammonia for fuel.

SUMMARY

A system for generating combustion gases is disclosed herein. In accordance with various embodiments, the system may comprise a combustion chamber and a first fuel injection system configured to inject a metal-based fuel into the combustion chamber. A metal-based fuel source may be configured to deliver the metal-based fuel to the first fuel injection system.

In various embodiments, the metal-based fuel may comprise a metal powder. The metal powder may form between 75% and 100% of a weight percentage of the metal-based fuel. In various embodiments, the metal powder may comprise at least one of magnesium, aluminum, or iron. In various embodiments, the metal-based fuel may comprise a mixture of a metal powder and a liquid. The liquid may be devoid of hydrocarbon.

In various embodiments, a hydrocarbon-based fuel source may be configured to deliver a hydrocarbon-based fuel to the first fuel injection system. In various embodiments, a first fuel duct may be connected between the metal-based fuel source and a first fuel injector of the first fuel injection system. A second fuel duct may be connected between the hydrocarbon-based fuel source and a second fuel injector of the first fuel injection system.

In various embodiments, a second fuel injection system may be configured to inject a hydrocarbon-based fuel into the combustion chamber. A hydrocarbon-based fuel source may be configured to deliver the hydrocarbon-based fuel to the second fuel injection system. In various embodiments, the first fuel injection system may be a radial fuel injection system, and the second fuel injection system may be an axial fuel injection system.

A turbine engine is also disclosed herein. In accordance with various embodiments, the turbine engine may comprise a fan, a compressor configured to receive a fluid flow from the fan, a combustor located at an output of the compressor, a turbine located at an output of the combustor, and a metal-based fuel source configured to deliver a metal-based fuel to the combustor.

In various embodiments, the metal-based fuel may comprise a metal powder. In various embodiments, an electric motor may be configured to drive a rotation of the fan. An electric generator may be configured to output an electrical current in response to the rotation of the fan.

In various embodiments, a controller may be operably coupled to the electric motor and the metal-based fuel source. The controller may be configured to control an output of the metal-based fuel to the combustor based on the electrical current output by the electric generator.

In various embodiments, a controller may be operably coupled to the metal-based fuel source and the electric motor. The controller may be configured to control whether the turbine engine operates as an electric turbine engine or a combustion gas turbine engine.

In various embodiments, a first fuel injection system may be configured to inject the metal-based fuel into a combustion chamber of the combustor. In various embodiments, a hydrocarbon-based fuel source may be configured to deliver a hydrocarbon-based fuel to the combustor. In various embodiments, the first fuel injection system may include a first fuel injector configured to inject the metal-based fuel into the combustion chamber, and a second fuel injector configure to inject the hydrocarbon-based fuel into the combustion chamber.

A metal-based fuel is also disclosed herein. In accordance with various embodiments, the metal-based fuel may comprise a metal powder. The metal powder may have at least one of a mass energy density of greater than or equal to 5.0 megajoules per kilogram or a volume energy density of greater than or equal to 35.0 megajoules per liter. The metal powder may be formed of particles that are substantially uniform in size.

In various embodiments, the metal powder may form between 75% and 100% of a weight percentage of the metal-based fuel. In various embodiments, the metal-based fuel may further include a liquid devoid of hydrocarbons. The metal powder may be mixed in the liquid. In various embodiments, the metal powder may comprise at least one of magnesium, aluminum, or iron.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface cross hatching lines may be used throughout the figures to denote different parts but not necessarily to denote the same or different materials.

Throughout the present disclosure, like reference numbers denote like elements. Accordingly, elements with like element numbering may be shown in the figures, but may not necessarily be repeated herein for the sake of clarity. Surface shading lines and/or cross-hatching may be used throughout the figures to denote different parts but not necessarily to denote the same or different materials.

As used herein, "aft" refers to the direction associated with the tail (e.g., the back end) of an aircraft, or generally, to the direction of exhaust of a gas turbine engine. As used herein, "forward" refers to the direction associated with the nose (e.g., the front end) of an aircraft, or generally, to the direction of flight or motion.

A first component that is "radially outward" of a second component means that the first component is positioned at a greater distance away from a central longitudinal axis of the gas turbine engine. A first component that is "radially inward" of a second component means that the first component is positioned closer to the engine central longitudinal axis than the second component.

Figure 1:
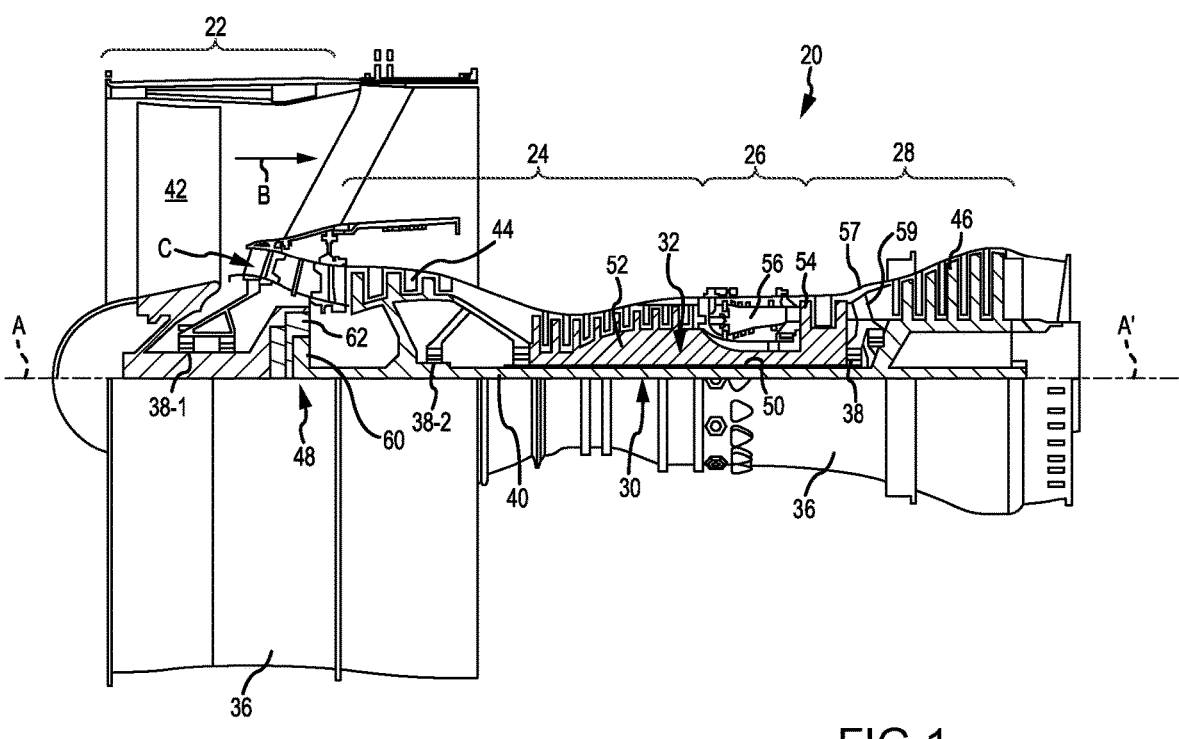
FIG. 1 illustrates an exemplary gas turbine engine, in accordance with various embodiments.

With reference to FIG. 1, a gas turbine engine 20 is provided, in accordance with various embodiments. Gas turbine engine 20 may be a two-spool turbofan that generally incorporates a fan section 22, a compressor section 24, a combustor section 26, and a turbine section 28. In operation, fan section 22 drives fluid (e.g., air) along a bypass flow-path B while compressor section 24 can drive air along a core flow-path C for compression and communication into combustor section 26 then expansion through turbine section 28. Although depicted as a turbofan gas turbine engine 20 herein, it should be understood that the concepts described herein are not limited to use with turbofans and the teachings may be applied to other types of turbine engines including multi-spool architectures, as well as industrial gas turbines.

Gas turbine engine 20 generally comprises a low speed spool 30 and a high speed spool 32 mounted for rotation about an engine central longitudinal axis A-A' relative to an engine static structure 36 via several bearing systems 38, 38-1, and 38-2. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure compressor 44, and a low pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and high pressure turbine 54. A combustor 56 may be located between high pressure compressor 52 and high pressure turbine 54. In various embodiments, engine static structure 36 may include a mid-turbine frame 57. The mid-turbine frame 57, if included, may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 then high pressure compressor 52, mixed and burned with fuel in combustor 56, then expanded through the high pressure turbine 54 and low pressure turbine 46. Turbines 46, 54 rotationally drive the respective low speed spool 30 and high speed spool 32 in response to the expansion.

As described in further detail below, gas turbine engine 20 is configured to use a metal-based fuel. In accordance with various embodiments, the metal-based fuel may be in the form of a metal powder, small metal particles, and/or metal ribbon pieces, which readily ignite and oxidize within the engine's combustor. The metal-based fuel may comprise magnesium, aluminum, iron, or other high energy density metal, and/or mixtures thereof. In various embodiments, gas turbine engine 20 may be powered solely using metal-based fuel. In various embodiments, gas turbine engine 20 may be configured to use both a conventional (e.g., hydrocarbon-based) jet fuel and a metal-based fuel, as described herein. In various embodiments, the metal-based fuel may be employed in an electric hybrid engine.

Figure 2:
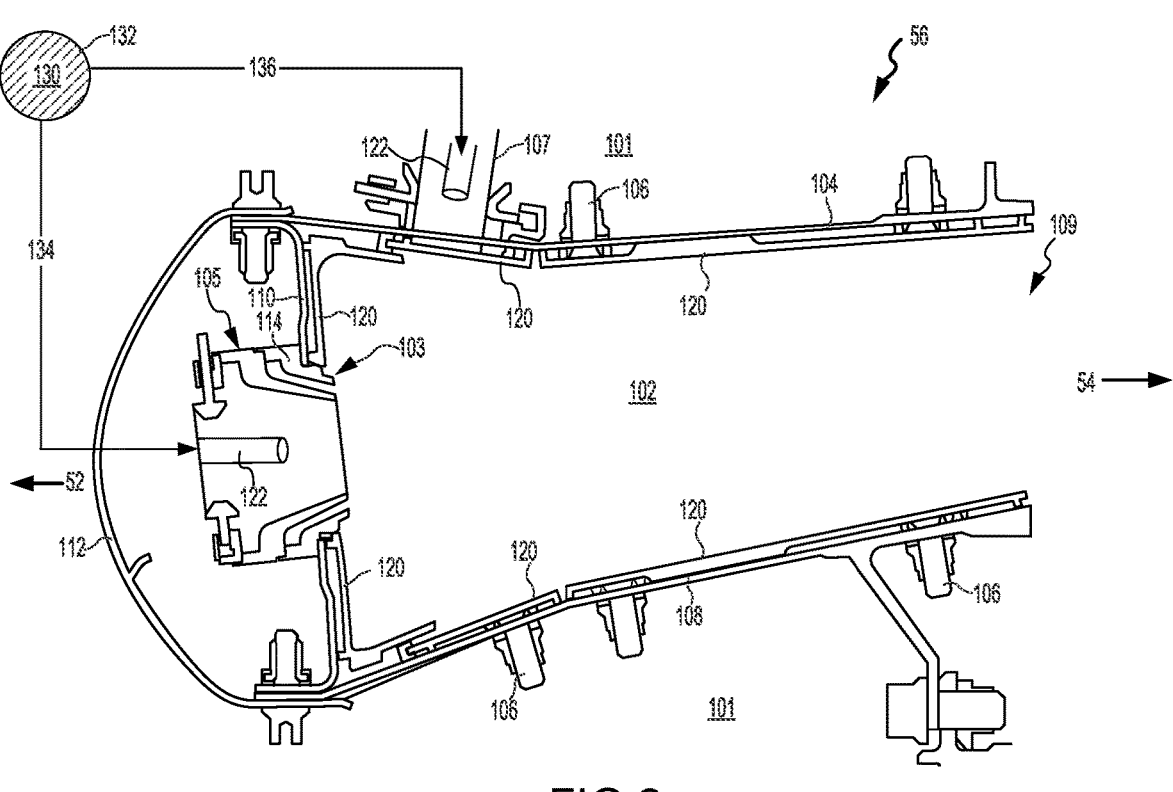
FIG. 2 illustrates a system for injecting metal-based fuel into a combustor, in accordance with various embodiments.

FIG. 2 shows an exemplary cross-section of combustor 56 positioned between high pressure compressor 52 and high pressure turbine 54 of a gas turbine engine 20. Combustor 56 includes a combustion chamber 102 defined by a combustor outer shell 104 and a combustor inner shell 108. Combustor inner shell 108 is radially inward of combustor outer shell 104. Combustor outer shell 104 and combustor inner shell 108 may provide structural support to combustor 56 and its components. Combustor outer shell 104 and combustor inner shell 108 may comprise cylindrical-shaped or conically shaped annular structured located concentrically about engine central longitudinal axis A-A'. A bulkhead shell 110 may be positioned at a forward end of combustion chamber 102. Bulkhead shell 110 extends radially between combustor outer shell 104 and combustor inner shell 108. Combustor 56 further includes an annular hood 112 and a plurality of swirlers 114 (one shown). In various embodiments, hood 112 and bulkhead shell 110 may be coupled between combustor outer shell 104 and combustor inner shell 108. Swirlers 114 may be located through openings defined by bulkhead shell 110. It may be desirable to protect combustor outer shell 104, combustor inner shell 108, and bulkhead shell 110 from the high temperatures, flames, and/or combustion gases within combustion chamber 102. Accordingly, one or more combustor panels 120 (also referred to as thermal shields or combustor liners) may be disposed inside combustion chamber 102 and may provide such thermal protection. In various embodiments, fasteners 106 may couple the combustor panels 120 to combustor outer shell 104 and combustor inner shell 108. Fasteners 106 may comprise threaded studs, nuts and bolts, clips, rivets, or any other suitable securement mechanism.

Combustion chamber 102 may be configured to direct high-speed exhaust gases produced by the ignition of fuel inside the combustor 56. The fuel may be injected at an inlet 103 of combustion chamber 102 by an axial fuel injection system 105 located at the forward end of combustion chamber 102. In various embodiments, combustor 56 may also include one or more radial fuel injection system(s) 107 located through combustor outer shell 104 and/or through combustor inner shell 108. Axial fuel injection system 105 may output fuel in a generally axial direction (e.g., in a direction generally parallel to engine central longitudinal axis A-A', for example, in a direction ±15° from parallel to engine central longitudinal axis A-A'). Radial fuel injection system 107 may output fuel in a generally radial direction (e.g., in a direction generally perpendicular to engine central longitudinal axis A-A', for example, in a direction ±15° from perpendicular to engine central longitudinal axis A-A'). The high-speed exhaust gases may be driven downstream within the combustor 56 towards a combustor outlet 109. Combustor outlet 109 may be located forward of a first vane stage of high pressure turbine 54.

In accordance with various embodiments, a metal-based fuel 130 from a fuel source 132 is delivered to combustor 56. For example, fuel source 132 may include a hopper, a servo-controlled flap, a shaking screen, or other suitable powder distributer. Metal-based fuel 130 may be delivered to axial fuel injection system 105 via a fuel duct 134 and to radial fuel injection system 107 via a fuel duct 136. In various embodiments, a blower, pump, ejector, fan, or other fuel driver may be employed to drive metal-based fuel 130 along fuel ducts 134, 136 and into axial fuel injection system 105 and/or into radial fuel injection system 107, respectively. Axial fuel injection system 105 and radial fuel injection system 107 may each include fuel injector(s) 122 (e.g., servo-controlled flap, shaking screen, pump, blower, nozzle, etc.) configured to disperse metal-based fuel 130 so it may mix with the compressed air from core flow path C. In this regard, axial fuel injection system 105 and radial fuel injection system 107 cause metal-based fuel 130 to mix with the air flowing through core C (e.g., with air output by compressor section 24), whereby the metal-based fuel and compressed air form a fuel air mixture, which is ignited in combustion chamber 102. Stated differently, combustor 56 includes a means for injecting metal-based fuel 130 (e.g., metal powder) into the combustion chamber 102 and igniting (e.g., oxidizing) the metal-based fuel 130 within the combustion chamber 102.

In various embodiments, metal-based fuel 130 comprises a metal powder. For example, a metal powder may form approximately 100% of metal-based fuel 130. Stated differently, metal powder (e.g., magnesium powder, aluminum powder and/or iron powder) may constitute approximately 100% of a weight percentage of metal-based fuel 130. As used in the previous context, approximately 100% means 99.5% or greater. In various embodiments, metal-based fuel 130 may comprise a metal powder and one or more other material(s) (e.g., additives and/or impurities). For example, metal powder (e.g., magnesium powder, aluminum powder and/or iron powder) may constitute between 75% and 100%, between 85% and 100%, between 95% and 100%, or between 99% and 100% of the weight percentage of metal-based fuel 130. In various embodiments, metal-based fuel 130 may comprise a slurry having a metal powder mixed or suspended in a liquid. As disclosed herein, slurries do not include hydrocarbon-based fuels or organic liquids. Stated differently, metal-based fuel 130 may comprise metal powder mixed in a liquid that is devoid of hydrocarbons. In various embodiments, the metal powder (e.g., magnesium powder, aluminum powder and/or iron powder) may constitute a 75% or greater weight percentage of the slurry (e.g., of the metal powder liquid mixture). In various embodiments, the metal powder may constitute a 85% or greater or a 90% or greater weight percentage of the slurry. In accordance with various embodiments, metal-based fuel 130 is delivered (e.g., injected) into combustion chamber 102 separate from any hydrocarbon-based fuels, which may be injected into and ignited within combustion chamber 102. In this regard, metal-based fuel 130 is a fuel source, rather than a fuel additive, for gas turbine engine 20.

In accordance with various embodiments, metal-based fuel 130 may comprise a metal powder (e.g., magnesium powder, aluminum powder and/or iron powder) comprised of nano sized metal particles (e.g., particles having an average particle size of less than 1000 nanometers). For example, a mean particle size, or mean particle diameter, of metal-based fuel 130 may be between 5 nanometers and 500 nanometers, between 50 nanometers and 250 nanometers, or between 100 nanometers and 200 nanometers. In various embodiments, the metal powder may be formed of metal particles having a mean particle size, or mean particle diameter, of between 0.1 microns and 1000 microns, between 0.5 microns and 100 microns, and/or between 1.0 microns and 10 microns. In accordance with various embodiments, metal-based fuel 130 may comprise a metal powder having particles that are substantially uniform in size. As used herein, "substantially uniform" means that at least 90% of the particles exhibit 10% or less variance in particle size and/or particle diameter relative to the mean particle size and/or mean particle diameter, respectively.

In various embodiments, metal-based fuel 130 may comprise metal ribbons (e.g., magnesium ribbons, aluminum ribbons, and/or iron ribbons). Metal ribbons have a length and a width that are greater than a thickness of the metal ribbon. For example, a metal ribbon may have a generally rectangular shape. A ratio of the length of the ribbon to the thickness of the ribbon and a ratio of the width of the ribbon to the thickness of the ribbon are each at least 10:1. In various embodiments, the mean thickness (e.g., the smallest dimension) of the metal ribbons may be between 5 nanometers and 500 nanometers, between 50 nanometers and 250 nanometers, or between 100 nanometers and 200 nanometers. In various embodiments, the mean thickness (e.g., the smallest dimension) of the metal ribbons may be between 0.1 microns and 1000 microns, between 0.5 microns and 100 microns, and/or between 1.0 microns and 10 microns. In accordance with various embodiments, metal-based fuel 130 may comprise metal ribbons that are substantially uniform in size. As used herein, "substantially uniform" means that at least 90% of the ribbons exhibit 10% or less variance in each of length, width, and thickness relative to the mean length, mean width, and mean thickness, respectively.

In accordance with various embodiments, metal-based fuel 130 comprises a high energy density metal or high energy density metal alloy. For example, metal-based fuel 130 may comprise magnesium, aluminum, iron, and/or combinations thereof. In accordance with various embodiments, metal-based fuel 130 may comprise a powder containing a mixture of high energy density metals or high energy density metal alloys. In various embodiments, the mixture may include least one of magnesium, aluminum, or iron. The powder mixture may comprise particles that are substantially uniform in size. As used herein, "substantially uniform" means that at least 90% of the particles in the mixture exhibit 10% or less variance in particle size and/or particle diameter relative to the mean particle size and/or mean particle diameter, respectively. In various embodiments, the mixture may comprise a mix of a first metal powder having particles of a first mean particle size and a second metal powder having particles of a second mean particle size. The second mean particle size may be greater than the first mean particle size, and the metal of the second powder may be different from the metal of the first powder. The particles of the first metal powder and the particles of the second metal powder may each be substantially uniform size, meaning at least 90% of the particles of the first metal powder exhibit 10% or less variance in particle size relative to the first mean particle size and at least 90% of the particles of the second metal powder exhibit 10% or less variance in particle size relative to the second mean particle size.

In various embodiments, metal-based fuel 130 may have a mass energy density of at least 5.0 megajoules per kilogram (MJ/kg). In various embodiments, metal-based fuel 130 may have a mass energy density of at least 20.0 MJ/kg. In various embodiments, metal-based fuel 130 may have a mass energy density of at least 30.0 MJ/kg. In various embodiments, metal-based fuel 130 may have a volumetric energy density of at least 35.0 megajoules per liter (MJ/L). As used herein, volumetric energy density (MJ/L) is determined at standard sea level conditions (e.g., a pressure of 101.325 kPA (29.921 inch of mercury (inHg)) and/or a temperature of 15° C. (59° F.)). In various embodiments, metal-based fuel 130 may have a volumetric energy density of at least 40.0 MJ/L. In various embodiments, metal-based fuel 130 may have a volumetric energy density of at least 80.0 MJ/L. In various embodiments, the mass energy density (MJ/kg) of metal-based fuel 130 may be less than the mass energy density of conventional hydrocarbon-based jet fuel, while the volumetric energy density (MJ/L) of metal-based fuel 130 may be greater than the volumetric energy density of conventional hydrocarbon-based jet fuel. Thus, an aircraft's fuel needs may be met with a smaller volume, but slightly greater mass, of metal-based fuel 130 as compared to conventional hydrocarbon-based jet fuel. While the fuel mass may be greater as compared to conventional hydrocarbon-based jet fuel, employing metal-based fuel 130 in place of hydrocarbon-based jet fuel tends to reduce, or eliminate, carbon emissions along with the reliance on fossil fuels. Further, metal-based fuel 130 may be stored at room and/or ambient temperatures and pressures, thereby reducing, or eliminating, the need for refrigeration and/or pressure containment vessels.

Figure 3:
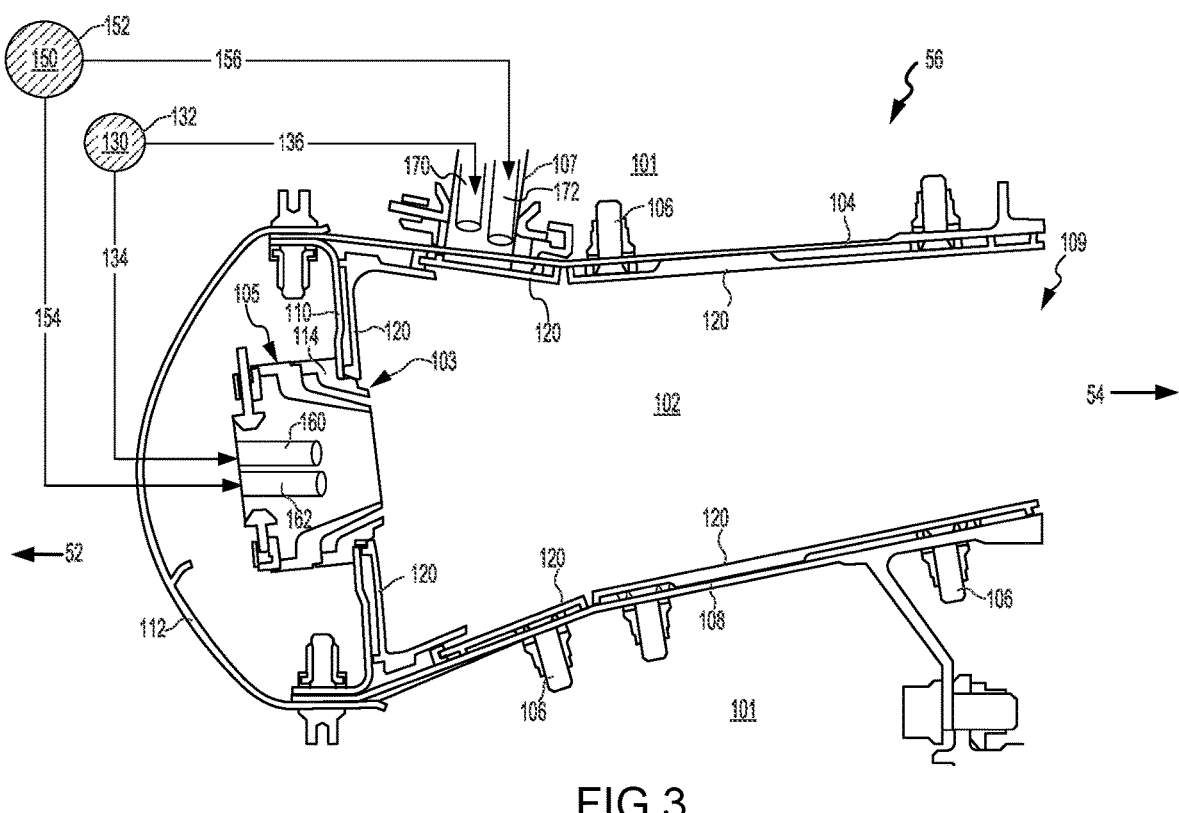
FIG. 3 illustrates a system for injecting metal-based fuel and hydrocarbon-based fuel into a combustor, in accordance with various embodiments.

In FIG. 3, combustor 56 is configured to receive metal-based fuel 130 from fuel source 132 and a hydrocarbon-based fuel 150 from a second fuel source 152. Metal-based fuel 130 may be delivered to axial fuel injection system 105 via fuel duct 134 and to radial fuel injection system 107 via fuel duct 136. Hydrocarbon-based fuel 150 may be delivered to axial fuel injection system 105 via a fuel duct 154 and to radial fuel injection system(s) 107 via a fuel duct 156.

In accordance with various embodiments, axial fuel injection system 105 and/or radial fuel injection system 107 are configured such that either hydrocarbon-based fuel 150 or metal-based fuel 130 is delivered into combustion chamber 102 at one time. For example, during take-off and climb, hydrocarbon-based fuel 150 may be injected into combustion chamber 102, and during cruise, metal-based fuel 130 may be injected into combustion chamber 102, or vice versa. In various embodiments, metal-based fuel 130 may be injected into combustion chamber 102 via a first injector 160 of axial fuel injection system 105 connected to fuel duct 134, and hydrocarbon-based fuel 150 may be injected into combustion chamber 102 via a second injector 162 of axial fuel injection system 105 connected to fuel duct 154. In various embodiments, metal-based fuel 130 may be injected into combustion chamber 102 via a first injector 170 of radial fuel injection system 107 connected to fuel duct 136, and hydrocarbon-based fuel 150 may be injected into combustion chamber 102 via a second injector 172 of radial fuel injection system 107 connected to fuel duct 156. In various embodiments, axial fuel injection system 105 and/or radial fuel injection system 107 are configured such that hydrocarbon-based fuel 150 and metal-based fuel 130 are delivered into combustion chamber 102 together. For example, first injector 160 and second injector 162 may simultaneously inject metal-based fuel 130 and hydrocarbon-based fuel 150, respectively, into combustion chamber 102.

While axial fuel injection system 105 is illustrated as injecting both metal-based fuel 130 and hydrocarbon-based fuel 150, in various embodiments, each of metal-based fuel 130 and hydrocarbon-based fuel 150 may have their own dedicated axial fuel injection system. For example, a first axial fuel injection system may inject metal-based fuel 130 into combustion chamber and a second axial fuel injection system may inject hydrocarbon-based fuel 150 into combustion chamber 102. Similarly, in various embodiments, each of metal-based fuel 130 and hydrocarbon-based fuel 150 may have their own dedicated radial fuel injection system, such that a first radial fuel injection system injects metal-based fuel 130 into combustion chamber 102 and a second radial fuel injection system injects hydrocarbon-based fuel 150 into combustion chamber 102.

Generating, at least, a portion of the gas turbine engine energy via metal-based fuel 130 reduces the volume of hydrocarbon-based fuel, and thus carbon emissions, associated with gas turbine engine 20. For example, if a 20% reduction in the carbon emissions of gas turbine engine 20 was desired, 20% of the energy produced by gas turbine engine 20 may be produced by igniting metal-based fuel 130, with the remaining 80% of the energy being produced by igniting hydrocarbon-based fuel 150.

Figure 4:
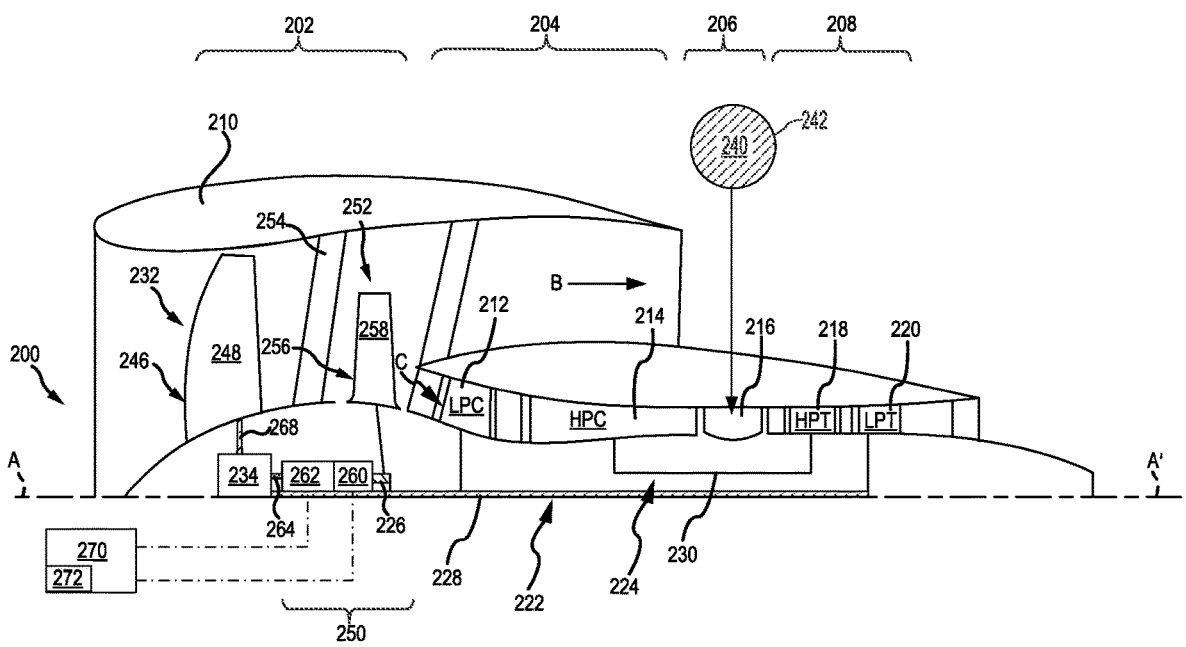
FIG. 4 illustrates a cross-section view of a hybrid turbine engine, in accordance with various embodiments; in accordance with various embodiments.

With reference to FIG. 4, a hybrid turbine engine 200 is provided. As used herein, a "hybrid turbine engine" refers to an engine that employs both electrical current and combustion gases to generate thrust. Hybrid turbine engine 200 may be a two-spool turbofan, similar to gas turbine engine 20 in FIG. 1. In this regard, engine 200 generally incorporates a fan section 202, a compressor section 204, a combustor section 206, and a turbine section 208. In operation, fan section 202 drives fluid (e.g., air) along a bypass flow-path B defined, at least partially, by a nacelle 210, and also along a core flow-path C for compression by a low pressure compressor 212 and a high pressure compressor 214, then communication into a combustor 216, and then expansion through a high pressure turbine 218 and a low pressure turbine a 220.

Hybrid turbine engine 200 may comprise a low speed spool 222 and a high speed spool 224 mounted for rotation about engine central longitudinal axis A-A'. In various embodiments, hybrid turbine engine 200 may further include an after-fan turbine spool 226 (also referred to as an after-fan turbine shaft) mounted for rotation about engine central longitudinal axis A-A'.

Low speed spool 222 includes a low speed shaft 228 that connects fan 232, low pressure turbine 220, and low pressure compressor 212. Low speed spool 222 may be connected to fan 232 through a gear assembly 234 that can drive fan 232 at a lower speed than low speed spool 222. Gear assembly 234 rotationally couples low speed shaft 228 to fan 232, thereby transferring torque from low speed shaft 228 to fan 232 and providing rotational force to fan 232. High speed spool 224 includes a high speed shaft 230 that connects high pressure compressor 214 and high pressure turbine 218. A rotations per minute (RPM) of high speed shaft 230 is generally greater than a RPM of low speed shaft 228.

Combustor 216 may be located between high pressure compressor 214 and high pressure turbine 218. Combustor 216 is configured to receive a metal-based fuel 240 from a fuel source 242 (e.g., a hopper). Metal-based fuel 240 is delivered to combustor 216 and mixed with the air flowing through core C to form a fuel air mixture, which is ignited in combustor 216. Stated differently, combustor 216 includes a means for injecting metal-based fuel 240 into its combustion chamber and igniting (e.g., oxidizing) the metal-based fuel 240 within the combustion chamber. Metal-based fuel 240 may be similar to the metal fuel 130, as described in FIG. 2. In accordance with various embodiments, metal-based fuel 240 is delivered (e.g., injected) into combustor 216 separate from any hydrocarbon-based fuels, which may be injected into combustor 216.

Fan 232 may include one or more rotor assemblies (stages) 246. Rotor assemblies 246 may each comprise a plurality of blades 248 configured to rotate about engine central longitudinal axis A-A'. In various embodiments, an after-fan system 250 is located at an aft (or outlet) end of fan 232. After-fan system 250 may include an after-fan turbine 252 located aft of an exit guide vane assembly 254.

After-fan turbine 252 includes one or more rotor assemblies (rotor stages) 256. Rotor assemblies 256 each comprise a plurality of blades 258. Blades 258 may each be coupled to a disk, which may be configured to rotate about engine central longitudinal axis A-A'. The disk may be centered about the rotation axis of with the plurality of blades 258 attached to the disk and spaced apart in the circumferential direction. Fluid output from fan 232 may drive rotation of blades 258, thereby rotating after-fan turbine shaft 226. In various embodiments, after-fan turbine 252 may include multiple stages of rotating blades with one or more stages of stationary vanes axially interspersed between the stages of rotating blades. The flow output by after-fan turbine 252 may be provided to bypass flow-path B and to core flow-path C.

In accordance with various embodiments, after-fan system 250 may include an electrical generator 260 operationally coupled to after-fan turbine 252. Electrical generator 260 is configured to generate current (e.g., alternating current (AC)), in response to rotation of after-fan turbine 252. After-fan turbine shaft 226 of after-fan system 250 connects after-fan turbine 252 and to the input of electrical generator 260. In this regard, after-fan turbine shaft 226 may form a mechanical input of electrical generator 260.

After-fan system 250 further includes an electric motor 262 operationally coupled to electrical generator 260. Electric motor 262 may be configured to generate torque or other mechanical energy in response to an electrical signal (e.g., current) output by electrical generator 260. Electric motor 262 is operationally coupled to fan 232. In accordance with various embodiments, electric motor 262 is configured to transfer torque to fan 232. In various embodiments, electric motor 262 may be rotationally coupled to fan 232 via gear assembly 234. In this regard, electric motor 262 may drive rotation of gear assembly 234, thereby causing rotation of fan 232. In various embodiments, electric motor 262 is mechanically (e.g., rotationally) coupled to gear assembly 234 via a motor shaft 264. Motor shaft 264 rotationally couples the output of electric motor 262 to the input of gear assembly 234. In this regard, motor shaft 264 transfers torque from electric motor 262 to gear assembly 234, thereby causing rotation of fan 232. In various embodiments, an input shaft 268 of fan 232 may be rotationally coupled to, and/or may form an output of, gear assembly 234. In this regard, gear assembly 234 drives rotation of (e.g., transfers torque to) fan input shaft 268. Rotation of fan input shaft 268 drives rotation of fan 232.

In accordance with various embodiments, after-fan turbine 252 is configured to extract energy from the flow of fluid output by fan 232 and return energy to fan 232 through torque. After-fan turbine shaft 226 transfers torque from after-fan turbine 252 to electrical generator 260. Electrical generator 260 is configured to generate electrical current in response to the torque generated by after-fan turbine 252 and transferred to electrical generator 260 via after-fan turbine shaft 226. In various embodiments, electrical generator 260 may comprise an AC generator with permanent magnet, an AC generator without permanent magnet, an AC self-oscillation rotary generator, or any other generator suitable for generating current in response to rotary motion.

The electrical current output from electrical generator 260 may be provided to electric motor 262. Electric motor 262 may comprise an asynchronous 3-phase AC motor, an AC switch reluctance motor (SRM), a solenoid-driven actuator, a motor driven actuator, or any other suitable electrical actuator. In response to receiving the electrical signal generated by electrical generator 260, electric motor 262 may transfer torque to, for example, gear assembly 234, thereby causing rotation of fan 232.

In various embodiments, a controller 270 may control the flow of electrical current to electric motor 262. Controller 270 may, for example, be a portion of a flight control computer, a portion of a Full Authority Digital Engine Control (FADEC), a stand-alone controller, or combinations thereof. In accordance with various embodiments, controller 270 may comprise one or more processors configured to implement various logical operations in response to execution of instructions, for example, instructions stored on a non-transitory, tangible, computer-readable medium. The one or more processors can be a general purpose processor, a microprocessor, a microcontroller, a digital signal processor (DSP), an application specific integrated circuit (ASIC), a field programmable gate array (FPGA) or other programmable logic device, discrete gate or transistor logic, discrete hardware components, or any combination thereof. Controller 270 may include a memory 272. Memory 272 may store executable instructions and data to implement control logic of controller 270. Memory 272 may comprise a non-transitory, tangible computer-readable medium having instructions stored thereon that, in response to execution by the controller 270, cause the controller 270 to perform various operations relative to the control of engine 200. For example, instructions for controlling when engine 200 generates thrust via the electric motor 262 and when engine 200 generates thrust via metal-based fuel 240. The term "non-transitory" is to be understood to remove only propagating transitory signals per se from the claim scope and does not relinquish rights to all standard computer-readable media that are not only propagating transitory signals per se.

In accordance with various embodiments, controller 270 controls the flow of metal-based fuel 240 to combustor 216. In this regard, controller 270 may determine whether combustion gases produced by igniting metal-based fuel 240 or electrical current produced by electrical generator 260 generates torque for rotation of fan 232. Stated differently, controller 270 is configured to control whether engine 200 operates as an electric turbine engine, wherein thrust is generated by an electric motor driving rotation of fan, or a combustion gas turbine engine, wherein thrust is generated by igniting fuel to produce combustion gases. For example, if the rpms of after-fan shaft turbine 226 or the current output by electrical generator 260 fall below a threshold level, controller 270 may cause metal-based fuel 240 to be injected into and ignited in combustor 216. Similarly, if the rpms of after-fan turbine shaft 226 and/or the current output by electrical generator 260 is equal to or greater than the threshold level, controller 270 may cease injection of metal-based fuel 240 into combustor 216. In various embodiments, controller 270 may be configured to inject metal-based fuel 240 based on flight parameters. For example, during start-up, take-off, and climb, controller 270 may cause metal-based fuel 240 to be injected into combustor 216. And during cruise and landing, controller 270 may operate engine in electric mode, wherein electric motor 262 drives rotation of fan 232. Employing metal-based fuel 240 in a hybrid turbine engine 200 allows for engine 200 to produce fewer carbon emissions, as compared to a hybrid engine that combusts hydrocarbon-based fuel when in combustion mode.

Figure 5:
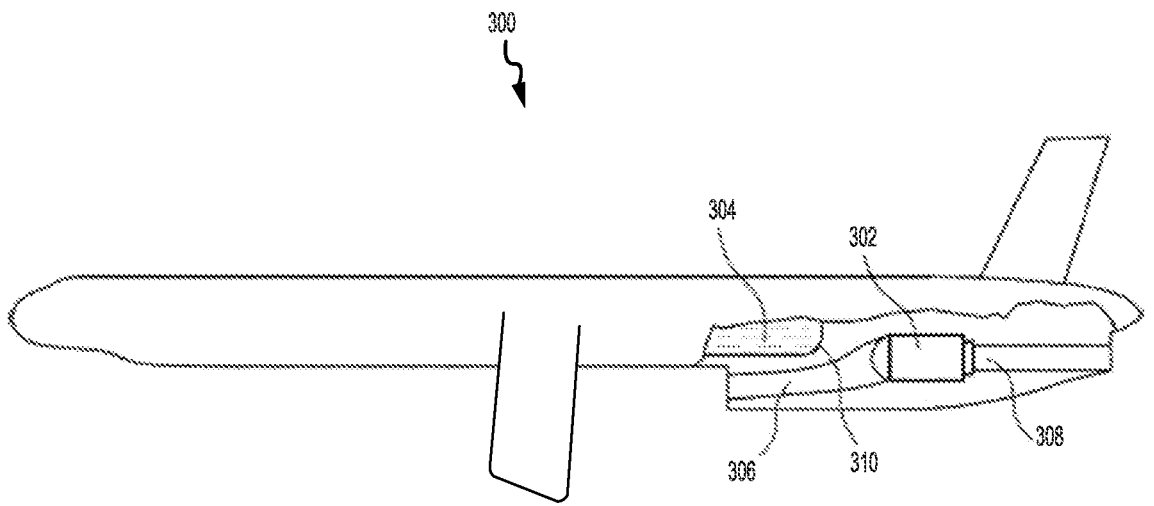
FIG. 5 illustrates an aerospace vehicle powered by a metal-based fuel; in accordance with various embodiments.

With reference to FIG. 5, a partial cross-sectional view of an aerospace vehicle 300 is illustrated. In various embodiments, aerospace vehicle 300 may be an Unmanned Air Vehicle (UAV) that utilizes an air-breathing power plant 302 and carries a metal-based fuel 304. Metal-based fuel 304 is similar to the metal-based fuel 130 described in FIG. 2. In various embodiments, the air-breathing power plant 302 may alternatively include a turbojet, turbofan, ramjet engine, or other motor for use in a manned vehicle as well.

The air-breathing power plant 302 receives air through an inlet 306 and produces power in the form of thrust through an exhaust 308 by burning the metal-based fuel 304 using oxygen available from the atmospheric air that flows through the inlet 306. The metal-based fuel 304 may be stored in a tank 310 carried by the vehicle 300 and delivered to the air-breathing power plant 302 as a pumpable, injectable, combustible metal material. In accordance with various embodiments, the combustion or oxidation of the metal-based fuel 304 provides benefits for the aerospace vehicle 300 over existing hydrocarbon-based fuels. For example, metal-based fuel 304 does not produce carbon emission and is not reliant on fossil fuels. Further, metal-based fuel 304 tends to display a better room temperature shelf stability, as compared to hydrocarbon-based fuels.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods, and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system for generating combustion gases, comprising:
   a combustor;
   a combustion chamber within the combustor and defined by a combustor outer shell and a combustor inner shell;

a bulkhead shell including at least one swirler and positioned at a forward end of the combustion chamber and coupled to the combustor outer shell and the combustor inner shell;

a first fuel injection system configured to inject a metal-based fuel and a hydrocarbon-based fuel radially into the combustion chamber though at least one of the combustor outer shell or the combustor inner shell in a direction generally perpendicular to a central longitudinal axis of the combustion chamber, wherein the first fuel injection system is further configured to deliver only one of the metal-based fuel or the hydrocarbon-based fuel radially into the combustion chamber at any one time;

a second fuel injection system configured to inject the metal-based fuel and the hydrocarbon-based fuel axially into the combustion chamber in a direction generally to the central longitudinal axis of the combustion chamber, wherein the second fuel injection system is further configured to deliver only one of the metal-based fuel or the hydrocarbon-based fuel axially into the combustion chamber at any one time;

a metal-based fuel source including metal ribbons and configured to deliver the metal-based fuel to the first fuel injection system and the second fuel injection system, the metal ribbons having a generally rectangular shape with a length, a width, and a thickness;

a first fuel duct connected between the metal-based fuel source and a first fuel injector of the first fuel injection system and configured to deliver the metal-based fuel radially to the combustion chamber;

a second fuel duct connected between the metal-based fuel source and a second fuel injector of the second fuel injection system and configured to deliver the metal-based fuel axially to the combustion chamber via the second fuel injector;

a hydrocarbon-based fuel source configured to deliver the hydrocarbon-based fuel to the first fuel injection system and the second fuel injection system;

a third fuel duct connected between the hydrocarbon-based fuel source and a third fuel injector of the first fuel injection system and configured to deliver the hydrocarbon-based fuel radially to the combustion chamber; and a fourth fuel duct connected between the hydrocarbon-based fuel source and a fourth fuel injector of the second fuel injection system and configured to deliver the hydrocarbon-based fuel axially to the combustion chamber via the fourth fuel injector, wherein a swirler of the at least one swirler surrounds the second fuel injector and the fourth fuel injector.

2. The system of claim 1, wherein the metal-based fuel further includes a metal powder.

3. The system of claim 2, wherein the metal powder comprises at least one of magnesium, aluminum, or iron.

4. The system of claim 1, wherein the metal-based fuel further includes a mixture of a metal powder and a liquid, and wherein the liquid is devoid of hydrocarbon.

5. The system of claim 1, wherein the length and the width are greater than the thickness.

6. The system of claim 1, wherein a first ratio of the length to the thickness is at least 10:1 and a second ratio of the width to the thickness is at least 10:1.

7. The system of claim 1, wherein the first fuel injection system and the second fuel injection system together are configured to deliver only one of the metal-based fuel or the hydrocarbon-based fuel radially into the combustion chamber at any one time.

* * * * *